United States Patent [19]

Voroba

[11] Patent Number: 5,117,977
[45] Date of Patent: Jun. 2, 1992

[54] SMALL BATTERY DISPENSING, INSERTION AND REMOVAL APPARATUS

[75] Inventor: Barry Voroba, Minnetonka, Minn.

[73] Assignee: Bausch & Lomb Hearing Systems Division, Inc., Eden Prairie, Minn.

[21] Appl. No.: 705,108

[22] Filed: May 24, 1991

[51] Int. Cl.$^5$ .............................................. B65D 73/02
[52] U.S. Cl. .................................. 206/333; 206/813; 429/99
[58] Field of Search .................. 206/333, 813; 429/99, 429/100

[56] References Cited

U.S. PATENT DOCUMENTS

| | | | |
|---|---|---|---|
| 3,433,351 | 3/1969 | Zaborney | 206/333 |
| 3,625,396 | 12/1971 | Phipps | 206/333 X |
| 3,712,695 | 1/1973 | Kaye | 206/333 X |
| 3,912,998 | 10/1975 | Harris | 206/333 X |
| 3,995,767 | 12/1976 | Brindley et al. | 206/333 |
| 4,015,708 | 4/1977 | Kelm | 206/333 |
| 4,209,091 | 6/1980 | Wieberman | 206/333 |
| 4,218,522 | 8/1980 | Motoyoshi | 206/333 |
| 4,860,890 | 8/1989 | Cerny et al. | 206/333 |
| 4,953,700 | 9/1990 | DeDino | 206/333 |
| 5,033,616 | 7/1991 | Wyser | 206/333 |

FOREIGN PATENT DOCUMENTS 1045650 10/1966 United Kingdom ............... 206/333

Primary Examiner—William I. Price
Attorney, Agent, or Firm—Dorsey & Whitney

[57] ABSTRACT

A novel way to package and dispense small batteries which provides an easy means for installation and ejection of batteries from their host device. The invention relates to devices for the insertion and removal of miniature batteries in electronic devices. More particularly, the invention relates to a single device which dispenses and provides insertion and removal capability for individually installing and deinstalling batteries in hearing aids. The invention is a multi-battery dispensing container which is reusable and stores the removed batteries within the container for recycling or proper disposal.

24 Claims, 5 Drawing Sheets

SMALL BATTERY DISPENSING, INSERTION AND REMOVAL APPARATUS

TECHNICAL FIELD

This invention pertains to an apparatus for packaging and dispensing, as well as inserting and removing small batteries from their host device. More particularly, this invention pertains to a hearing aid battery dispensing device that allows for easy installation and ejection of batteries from hearing aids.

BACKGROUND

The simple packaging for sale of standard size batteries to be used in consumer goods is a well-known art. Recent efforts in the art have been aimed at including expiration dates on the packages, incorporating battery testers within the packages and novel shapes for packaging.

Packaging and dispensing techniques for small non-standard size batteries are still developing and are undergoing changes. As batteries become smaller and more customized to their host products, suitable packaging and dispensing of the batteries has become increasingly more difficult. Battery technology has allowed batteries to become progressively smaller. This development along with the simultaneous development of smaller more densely packed and lower power electronic chips has allowed host devices for these batteries to decrease in size.

Unfortunately, an outgrowth of these developments is that batteries have decreased in size to the point were they can no longer be physically handled by many people. These batteries are smaller than human fingers can reasonably manipulate. In fact, many batteries are smaller than the size for a human finger tip. These tiny batteries are being incorporated in many devices that are used by the consuming public on a daily basis. The most prevalent use for small batteries are for electronic watches, cameras and hearing aids. These small batteries are packaged in a variety of multipack containers which allow individual dispensing of the batteries.

Hearing aid technology has been affected by these advances in battery and electronic technologies and has undergone advances in size and shape. As hearing aid technology progresses, hearing aid devices are becoming smaller and more specially shaped. Obviously, these smaller and specially shaped hearing aids require even smaller batteries to operate. Human hearing generally deteriorates with age. Therefore, hearing aids are more common with older generations. Many individuals within these older generations have lost their manual dexterity with age, their hands begin to shake and joints are not as flexible as they used to be. Also, individuals in this age group prefer simple things that are easy to use.

Hearing impaired individuals with dexterity and/or vision problems typically have great difficulty inserting and removing tiny hearing aid batteries. There are frequently adhesive tabs, even smaller than the batteries, that must be removed to activate the batteries. The polarity of the battery may have to be determined prior to loading. Presently, many of these impaired consumers must seek the aid of a professional or a younger person to simply install batteries in their medical devices. As the life expectancy and average age in our society continues to increase, the population grows older and there is a greater need for hearing aids. This means that a larger number of hearing impaired individuals will require assistance with hearing aid batteries. Many of these individuals desire their hearing aids to be simple and easy to use.

Our society also continues to become more environmentally aware and is stressing conservation and recycling to help keep the environment clean. Present battery technology does not make it economically feasible to recharge smaller batteries. Due to the process used in these batteries and their contents, over time they may pose threats to our environment. The discarding of packaging for consumer goods, paper, cardboard, plastics and styrofoam, has become a major contributor to our environmetal problems. Proper disposal of these small batteries and their packaging is only possible if they are easily collected after use. However, in the future it will become economically feasible and perhaps necessary under law to recycle batteries and their packaging.

It is known in the packaging art that convenience and ease of use increases the repeat of sales to the same consumer. It is also known in the art that consumer appeal for a product can be amplified by novel dispensing ideas such as see-through packaging, rotating parts, special apertures, enticing shapes and multi-packs. Also, a recent phenomena in the field has been packaging or dispensing ideas that are presented to the consumers as environmentally safe.

What is needed are devices which allow small batteries to be simply removed from devices and easily disposed.

What is needed are devices which allow for simple insertion of batteries in small devices.

What is needed are single motion insertion and single motion ejection procedures for these small batteries.

What is needed is a single device which removes spent batteries and dispenses new batteries by inserting them in their host device.

What is needed is a long lasting device which dispenses, inserts and removes hearing aid batteries.

What is needed is recyclable packaging for small batteries.

What is needed is easy storage of spent batteries for proper disposal or recycling.

Accordingly, there is an unanswered need for packaging of small batteries in dispensers which eliminate the need for manual intervention by the consumer to physically install and deinstall batteries into consumer goods. There is a need for technology that allows for advances in the size and recycling of batteries and their packaging. In addition, there is a need in the market place for novel and environmentally safe packaging and dispensing of small batteries.

The present invention is designed to address these needs.

SUMMARY OF THE INVENTION

This invention is a single device for the insertion and removal of miniature batteries in electronic devices. Specifically, the present invention is a device that allows for the dispensing of small hearing aid batteries in the same container that may be used for easy installation and removal of batteries from hearing aids. This is a particularly useful invention for individuals with hearing aids who have great difficulty handling tiny batteries and are unable to use any hearing aid which utilizes miniature batteries.

The hearing aid dispensing, insertion, and removal device can have two halves. One half can be specially designed for the right hearing aid with a battery compartment adapted to suitably retain the battery and the other half designed for the left hearing aid with a complimentary battery compartment. Each half has a rotatable cover protecting an internal disk which has at least one chamber for deinstallation of spent batteries and a plurality of chambers for installation of new batteries. The new batteries are located in the appropriate positions of this disk.

The operative portion of the invention comprises a series of chambers located on the internal disk. Each chamber is configured to perform either the function of removing small batteries from host electronic devices or the function of installing new batteries into a host device. Each chamber has a self-guiding feature which allows an individual to easily place the host object or hearing aid into the position necessary for the unloading or loading operation. The removal chamber ejects the spent batteries into a storage area.

To use the device, the user simply rotates the scalloped edged cover to reveal the removal chamber. He places his device over the chamber and with a single downward motion ejects the battery from the host device. Upon removal, the user again rotates the scalloped edged cover to reveal a battery loading chamber. Again the user places the host object above the chamber and with a single downward motion loads a fresh battery. The advantage of this device is that little manual dexterity is needed. The device is extremely easy and simple to use and will be a great aid to those who are unable to handle the tiny batteries used in modern day high technology devices.

Some of the smaller batteries used in electronic devices are oxygen activated batteries. These oxygen activated batteries will corrode and discharge with long exposure to air. To solve this problem, most small batteries which are oxygen activated are marketed to the consumer with tabs which must be removed prior to use. These tiny tabs are even more difficult to remove from the battery. With the present invention no tabs are needed. The insertion chamber can have a small plastic fitting which both holds the battery in place and protects the battery from exposure to oxygen.

In the future, it may become economically feasible to recharge these small batteries upon removal from the disposal or storage area of the invention. With this invention, the batteries, as well as the packaging container itself, can be recycled. Since the spent batteries are in a sotrage area within the device, the entire device can be simply returned to the battery supplier. The battery supplier can remove the spent batteries from within the device and reload the internal disk with fresh batteries. The removed batteries can then be either recycled or properly disposed.

It is an object of this invention to provide removal of hearing aid batteries.

It is an object of this invention to provide insertion of batteries into hearing aids.

It is an object of this invention to provide for removal or insertion of batteries from a small device with a single motion.

It is an object of this invention to provide the capability of both insertion and removal of hearing aid batteries in one device.

It is an object of this invention to provide consumers with convenient multi-battery packaging of small batteries.

It is an object of this invention to provide a single device with convenient dispensing packaging, as well as insertion and removal capability.

It is an object of this invention to retain expelled batteries for recycling or proper destruction.

It is an object of this invention to be able to reuse the packaging container.

It is an object of this invention to create a device with a long life expectancy.

It is an object of this invention to provide a covering for oxygen activated batteries so they are not exposed to air.

These and other objects and advantages of the invention will become obvious to those skilled in the art upon review of the description of a preferred embodiment, and the appended drawings and claims.

DETAILED DESCRIPTION OF THE PREFERRED EMBODIMENT

Figure 1:
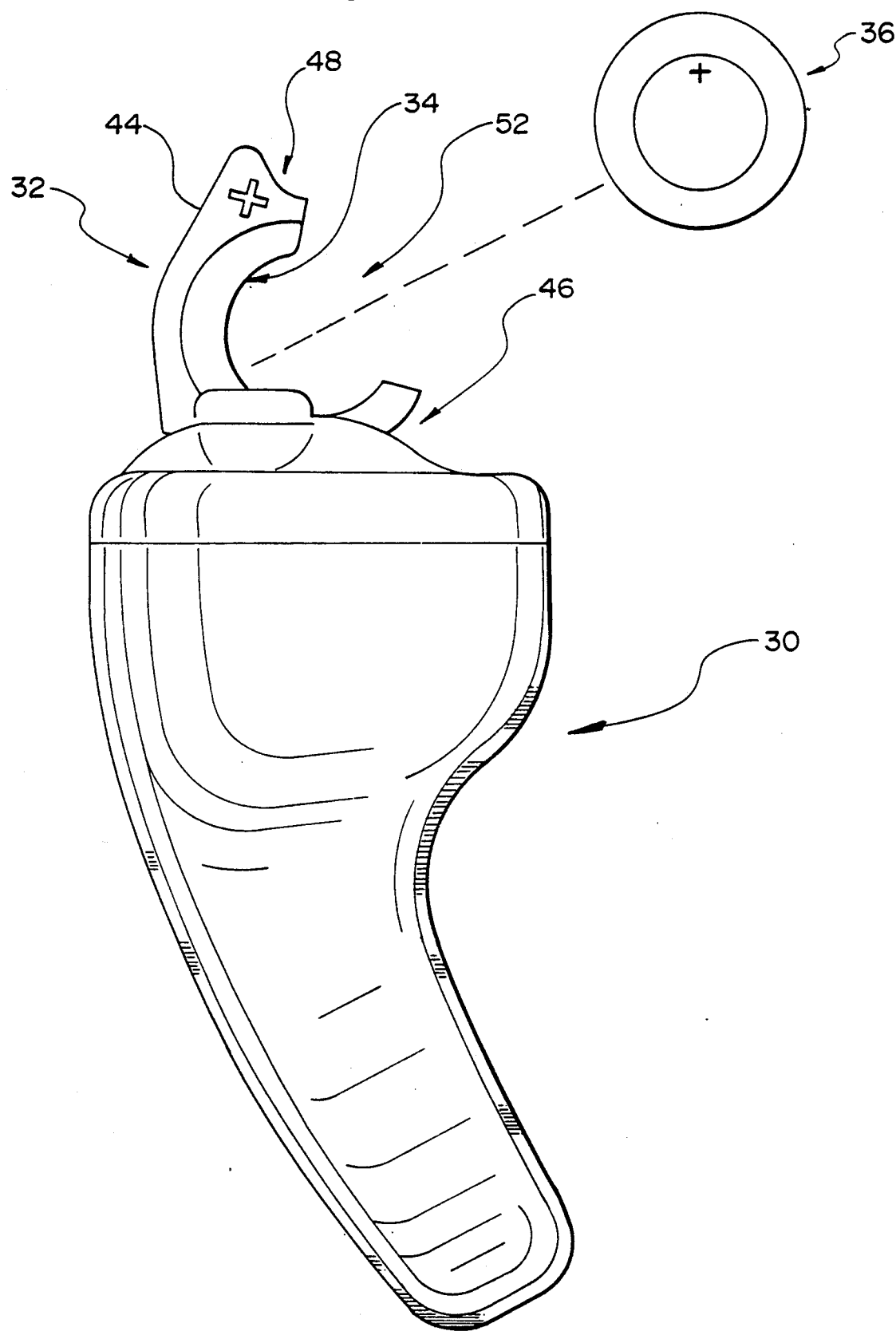
FIG. 1 is a bottom view of a hearing aid manufactured for the left ear of a patient with an open battery compartment into which a battery may be inserted.

Referring now to the drawings, the preferred embodiment of the present invention will be described.

Figure 2:
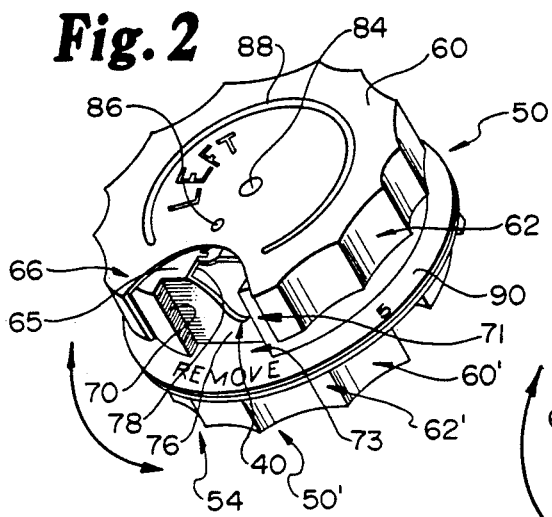
FIG. 2 is a perspective view of the invention showing the angled removal chamber or port for a left hearing aid. Another battery loader and removal device for a right hearing aid is shown located underneath and joined to the upper left hearing aid device.
Figure 3:
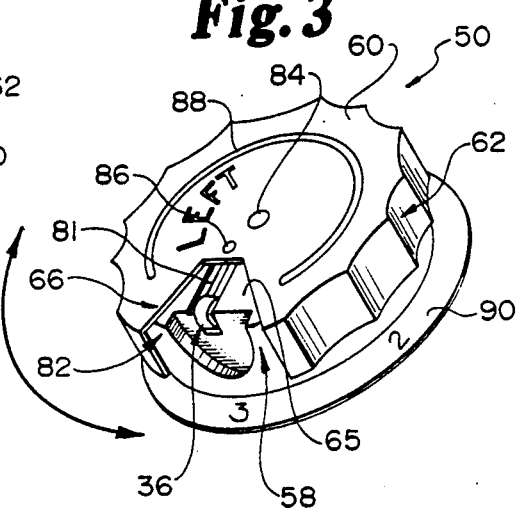
FIG. 3 is a perspective view showing the invention with a battery properly positioned in an insertion port of a battery insertion and removal device for left hearing aids.

A left ear hearing aid 30 is shown in FIG. 1 with the battery door 32 in an open position. Ergonomically a patient handles the aid 30 in the same orientation that it fits in the ear, with the top "up" and bottom "down." The battery 36 is retained by a ridge 34 around the "top" of the battery compartment 32. To discharge the battery 36, the battery must be pushed and rolled away from the ridge 34. When the hearing aid 30 is in the upright or top "up" position, the battery 36 must be pushed "down." When the hearing aid 30 is turned sideways with the battery compartment door 32 swinging upwardly, the battery 36 may be removed if pushed left for right hearing aids 30 or pushed right for left hearing aids 30. It is for this reason that the preferred embodiment of the invention 50 is designed for both right ear and left ear hearing aids 30 with opposing angular removal edges 40. Those skilled in the art will realize that both right and left aids 30 can be similarly structured requiring only a single battery loader and removal unit 50, such as shown in FIG. 3 rather than opposing back-to-back units 50, 50' such as shown in FIG. 2.

A representative battery compartment 32 for such a hearing aid 30 consists of a flexible plastic band 44 which is pivotally mounted in the face 46 of the hearing aid 30 and opened and closed using the fingernail in a notch 48 suitably designed for that purpose. The orifice 52 into which the battery 36 is inserted is typically ⅛ of an inch and the diameter of the battery compartment 32, and therefore the batteries 36, is typically 3/16 of an inch. To attempt to insert tiny batteries 36 into this compartment is a monumental task for less dexterous hands.

As shown in the remaining drawings, the present embodiment of the invention 50 is a multi-battery 36 container which easily removes, installs, and dispenses hearing aid batteries 36. The container 50 is reusable and stores the removed batteries 36 for proper disposal or recycling. The invention 50 contains both removal 54 and insertion chambers 58 for hearing aids 30 in a single device 50. The chambers 54, 58 are self-guiding and are simple to use. The invention 50 as shown in FIG. 2, is configured with a top half 50 and bottom half 50' each with a rotatable cover 60 which can be rotated to expose the chambers 54, 58 one at a time. The covers 60 have scaolloped edges 62 for easy grasping to rotate the cover 60 and expose the desired chamber 54 or 58. The device 50 is small enough with a diameter of less than three inches so as to be easily transported in luggage or a handbag.

Once the desired insertion 58 or removal chamber 54 is uncovered, loading or unloading of the battery 36 can occur. The cover 60 overlays an internal substrate 65 which preferably can be formed in the shape of a disk. The cover 60 protects the packaged batteries 36 which are located within the insertion chambers 58. The internal disk or substrate 65 which is shown in FIGS. 4 through 8 has six chambers 54, 58, preferably one removal chamber 54, and at least five insertion chambers 58, each having a pre-packaged battery 36.

With this invention 50, the very small battteris 36 associated with today's miniaturized microelectronic hearing aids 30 can be loaded and removed from such hearing aids 30 with ease. Formerly, hearing aid patients with poor hand coordination and dexterity or poor eyesight were unable to load and unload batteries 36 from their hearing aids 30. These patients were forced to seek professional or other help to replace the battery 36 in their hearing aid 30. This invention 50 requires little dexterity and coordination and provides easy insertion and removal of batteries 36 from small devices such as hearing aids 30.

As shown in FIG. 2, the removal chamber 54 of the left hearing aid dispensing, insertion and removal device 50 is exposed through a cover portal 66. The lower portion of the chamber 54 on the outer circumference of the disk 65 has vertical walls 70, 71 which extend to the bottom 73 of the chamber 54. These vertical walls 70, 71 assist in guiding the hearing aid 30 into proper position and guide it throughout its vertical descent during the ejection process. This outer depression 76 of the removal chamber 54 may also be shaped so that it conforms to the shape of the hearing aid 30 such as shown in connection with the insertion chambers 58. The removal chamber 54 has an aperture 78 with a particularly positioned edge 40 which causes removal of the hearing aid battery 36 during unloading. It is into this aperture 78 that the battery 36 would be expelled for storage.

The lower hearing aid insertion and removal device 50' can be similar to the top device 50 or can be constructed to accommodate a right ear hearing aid. The devices 50, 50' have flat plates or bottom platforms 80 and can be collocated by placing the platforms 80, 80' together. The devices can then be secured together at their platforms 80, 80' by glue or mechanical means. As shown, the two device covers 60, 60' would rotate independently.

Figure 7:
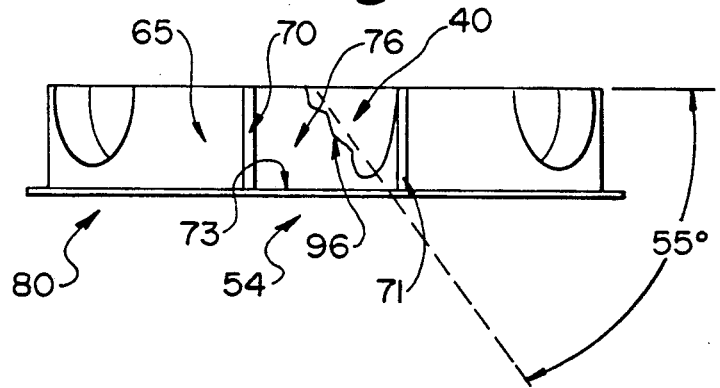
FIG. 7 is a side view showing the dimensions for the battery removal position of the apparatus.
Figure 8:
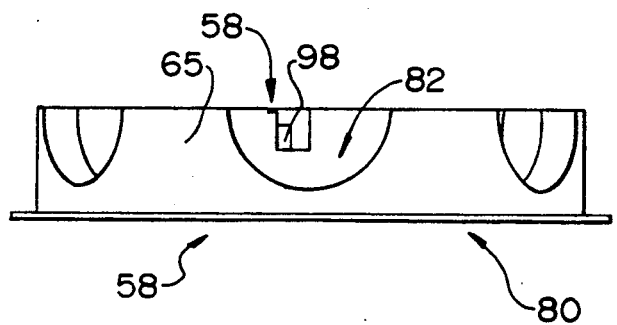
FIG. 8 is a view of the device showing overall dimensions and dimensions for the battery insertion positions of the apparatus.

FIG. 3 provides an overview of a preferred embodiment for a left hearing aid device 50. FIG. 3 shows an uncovered insertion chamber 58 with a battery 36 which is ready for installation into the hearing aid 30. The upper part of the chamber 58 has a channel 81 with a battery 36 in a position ready for loading. The lower part of the chamber 58 has a depression 82 which is formed to the shape of the hearing aid 30 to allow for easy insertion. The depression 82 can also be specially designed specifically for custom molded-shells and similarly shaped modular hearing aids by a deeper curvature on the side of the depression 82 which corresponds to the portion of the aid 30 which fits the back of the ear, although a substantially curvature has been found satisfactory as represented in FIG. 7 and 8.

The cover 60 of the device rotates on a center pin 84 which is either a screw or stake, a plastic center piece which is heat staked at the tip. The cover 60 is formed so that the center pin 84 may be recessed into the cover 60. This allows the top of the device 50 to be flat. The flat top allows for easier packing and stacking of devices 50. It also enables the device 50 to remain stable when laid cover down on a flat surface. The cover 60 has one portal 66 which is approximately the size of one chamber 54, 58. The cover portal 66 is rotated into a position which allows access to an insertion position 58. The cover 60 has a dimple 86 which extends downward towards the substrate 65 and acts as a detent prong. This prong 86 ensures that the cover 60 is properly located over a chamber 54, 58. Upon reaching the desired rotational position, the prong fits into the substrate 65 and allows the cover 60 to snap into place. The cover 60 also has a circular rill 88 which runs along the top. This rill 88 assists in keeping the cover 60 properly positioned over the stored batteries 36 in the substrate 65. The rill 88 keeps the cover 60 from making contact with the stored batteries 36 and dislocating the batteries 36. The cover 60 may also be constructed with two rills 88, so that the covered batteries 36 are located between the rills 88.

The scalloped sides 62 of the cover 60 and the labeled portion of the platform 90 are shown in FIG. 3. The cover 60 may be transparent for viewing the remaining batteries 36. Although a preferred embodiment of the cover 60 is made of plastic, other suitable materials may be used. The scalloped sides 62 of the cover 60 make it easier to handle the device 50 and assist in preventing the batteries 36 from being dislodged or damaged. The cover 60 also helps to extend the life of the device 50 and protect the device 50 while it is being transported back and forth to the manufacturer for repacking of new batteries 36.

Figure 4A:
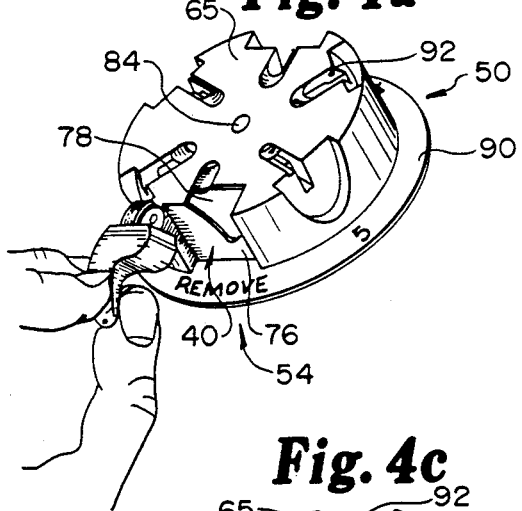
FIG. 4 consisting of FIGS. 1a, 4b and 4c is a schematic diagram of an uncovered battery loader and removal device showing the steps to remove a hearing aid battery.
Figure 4B:
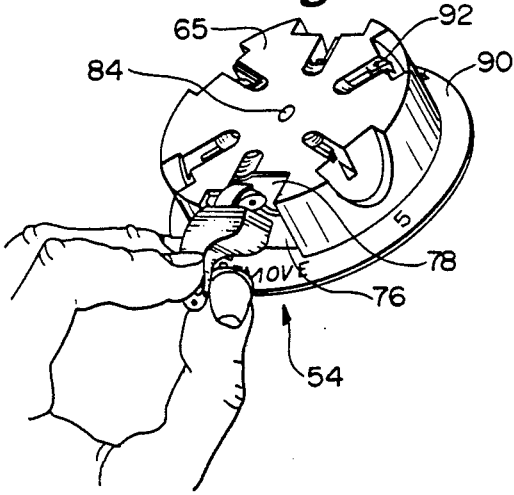
Figure 4C:
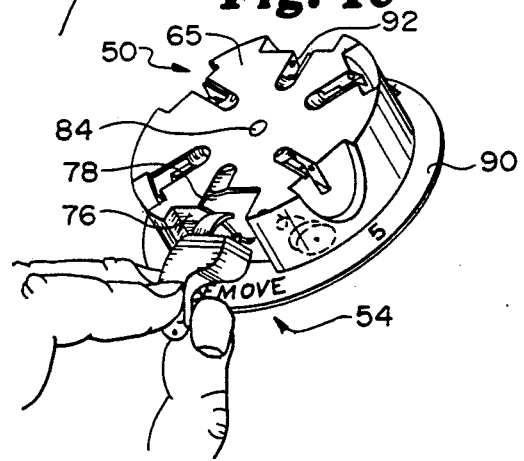

FIG. 4 shows the internal disk 65 and the steps involved in a removal operation. The hearing aid 30 is positioned over the left hearing aid battery removal chamber 54 and aperture 78 with its battery door 32 opened and the battery 36 exposed. With one downward motion, the following actions occur: the hearing aid 30 comes into contact with the depression 82 which guides it into position over the aperture 78, the battery 36 makes contact with the edge 40 of the aperture 78, and the battery 36 is pushed by the edge 40 to the right and out of the flexible battery holder 44 and expelled into the aperture 78 where it is stored. In this procedure, the battery 36 is gradually forced out to the side of the hearing aid battery door 32 and slides out of the holder 44 in the hearing aid battery door 32. FIG. 4 shows the internal disk 65 of the device 50 with no cover 60, mounting, or platform 80. This embodiment depicts six chambers 54, 58, five positions for installation 58 of a battery 36 and one for removal 54. The aperture 78 in the internal disk 65 for the storage of the expelled battery 36 can be seen at the removal chamber 54.

Figure 5A:
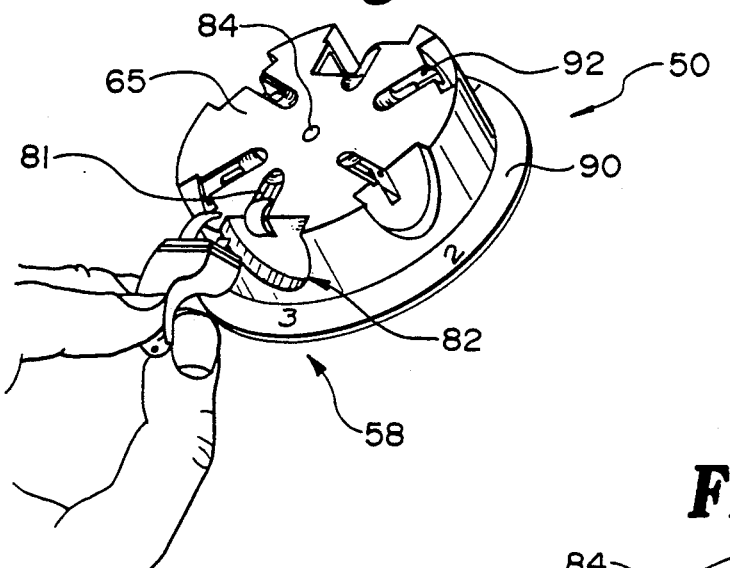
FIG. 5 consisting of FIGS. 5a, 5b and 5c is a similar schematic diagram of an uncovered battery loader and removal device showing the steps involved to load a battery.
Figure 5B:
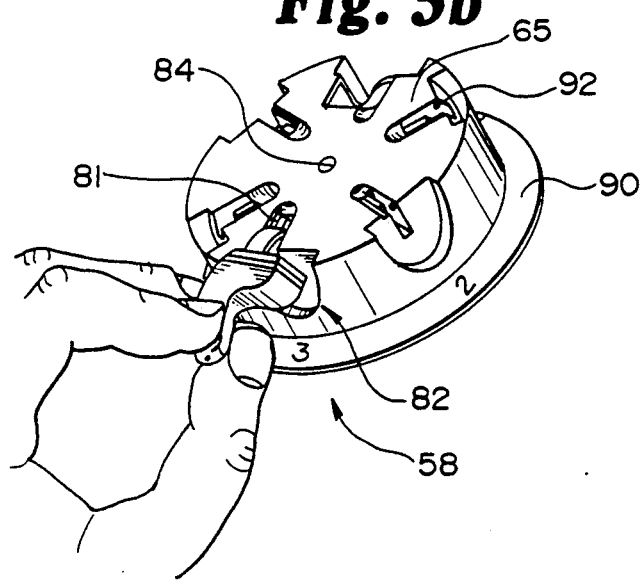
Figure 5C:
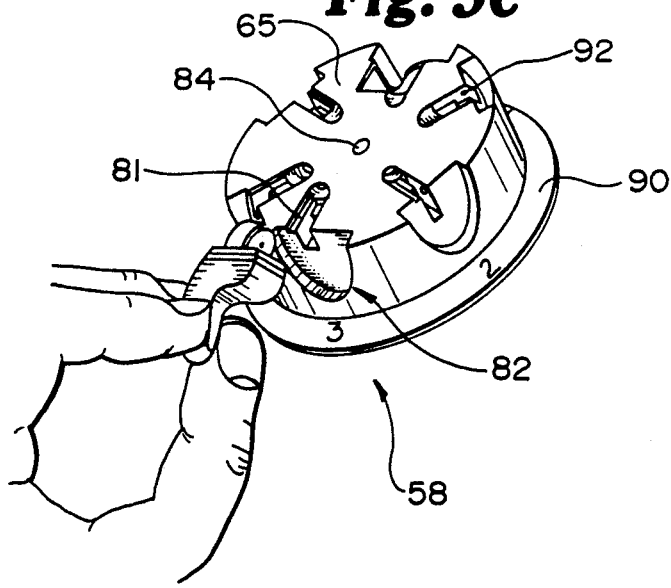

FIG. 5 shows the steps involved in the loading of a battery 36 from the device 50 into a hearing aid 30. The hearing aid 30 is positioned over the insertion device 50 with the battery door 32 in the open position. With one downward motion, the hearing aid battery door 32 is guided over the battery 36 and the battery 36 is installed. Each installation chamber 58 has a battery channel 81, a rectangular inset extending inwardly towards the center, which holds the battery 36 in place. This battery channel 81, in the internal portion of the device 65, firmly holds the new battery 36 in the correct insertion position to be loaded in a hearing aid 36. While it is possible to incorporate a plurality of batteries 36 in each battery channel 81, with spring loading (not shown), it is presently believed that the simple mechanism shown, with a minimum of mechanical mechanisms, is preferable.

In the battery channel 81 there is a small soft plastic extension 92 to the side of one of the walls. This soft plastic piece, the battery holder 92, has a diameter of approximately 0.045 inches extends approximately 0.016 inches from the wall 81 to which it is adhered. It serves two purposes, first it provides the tension necessary to help hold the battery 36 in place. And second, when using oxygen sensitive batteries such as a zinc air battery 36, it provides a cover for the battery openings to prevent air from reaching and eventually corroding the battery 36. By eliminating the need for a tab (not shown) on the oxygen activated batteries, the associated problems including difficulty to remove and accidentally expelling the battery 36 are also eliminated. The battery holder 92 also allows for the reloading of new batteries 36. Although the battery holder 92 can be made of the same plastic as the base portion of the device by including it in the plastic mold, gluing a separate soft plastic piece with the proper elasticity and thickness is a better method of making the device 50. Any soft plastic sphere or similar sized piece of pliable material can be used for the battery holder 92.

When all the batteries 36 in the device 50 have been dispensed, the consumer can return the device 50 to be refurbished. The battery holder 92 also allows for easy repacking of new batteries 36 in the device 50. The soft pliable battery holder 92 will allow the battery manufacturer or distributor to simple repack the device 50 with fresh batteries 36. By placing the new batteries 36 in the battery channel 81 and positioning them snugly within the battery holder 92 each insertion chamber 58 can be refurbished. Upon refurbishing the device 50 may be returned to the consumer as serviced or resold.

Figure 6:
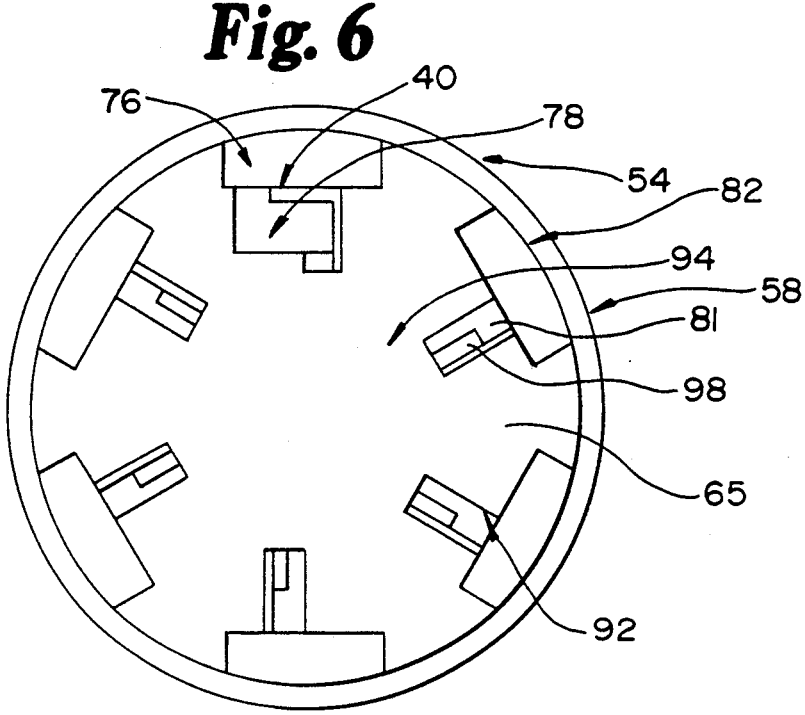
FIG. 6 is a top view showing internal dimensions of a preferred embodiment.

FIG. 6 shows the top view with the internal dimensions of a preferred embodiment for a left hearing aid battery dispensing, insertion, and removal device 50. The internal disk 65 has a flat bottom, a platform 80, which has a larger diameter than the upper portion of the disk 65. The chambers 54, 58 are all located on the upper portion of the internal disk 65. There are six chambers 54, 58 located on the outside part of the circular disk 65 arranged in a pattern each spaced 60 degrees from each other. As the diameter of the device 50 is increased or the hearing aid 30 size is reduced more chambers 54, 58 may be placed on the disk 65. The battery channels 81 on this left hearing aid device 50 are located on the left side of the center diameter 94 which bisects the insertion chamber 58 for left hearing aids. For the right hearing aid device the battery channel 81 is located on right side of the diameter 94 which bisects the insertion chamber 58. Different types of hearing aids may require a change in the exact location of the battery channel 81.

FIG. 7 is a side view of a left hearing aid battery insertion and removal device 50 particularly showing the dimensions and shape of the aperture's 78 edge 40 for the battery removal chamber 54 of the apparatus 50. The cut out for the edge 40 from the device 50 is stepped 96 from the top of the device 50 towards the bottom of the chamber 73. Although a single angle removal edge 40 will expel the battery, the stepped 96 removal 40 is a preferred embodiment. The stepped edge 40 overall forms roughly a 55 degree angle with the upper portion of the device 50 and is approximately 0.15 inches in the horizontal direction, 0.3 inches in height and has a width of approximately 0.070 inches. The preferred angles of the steps 96 is based upon the tension mounting mechanism of the battery 36 in the host device. The size of the removal chamber 54 is dependent on the size of the battery 36 and hearing aid 30 or host devices mounting mechanism. The angle must be sufficiently steep to expel the battery 36 from its holder 34 without exerting undue pressure on the holder 34 (door 32). An angle of approximately 55 degrees has been found to work well.

The lower portion of the removal chamber 54 is depicted with straight sidewalls 70, 71. The straight sidewalls 70, 71 allow for greater vertical travel of the hearing aid while still providing sufficient self-guiding features. The lower portion of the removal chamber 54 may also be formed with a depression 76 in a similar manner to the lower portion of the insertion chamber 58.

Behind the battery removal edge 40, is located the aperture 78 in which the expelled battery 36 is ejected. The aperture 78 is formed within the substrate 65. The aperture 78 must be larger than the ejected battery 36 and located in an appropriate position in relation to the removal edge 40 so as to allow the battery 36 to roll or fall into the aperture 78. The aperture 78 leaves the battery 36 in the center of the internal disk 65 where it may be safely stored. The inside of the aperture 78 can be lined with a sticky substance which functions to retain the batteries safely within the substrate 65. Baffles or other structures may be added within the aperture 78 to safely store the expelled batteries 36 and prevent them from rolling or falling out. An opening may be provided in the base platform 80 for removing the expelled batteries 36 from the internal disk 65 of the device 50.

FIG. 8 is a side view of the left hearing aid battery device 50 showing the overall diameter to be 2.750 and an inner diameter to be 2.500 inches with a height of 0.500 inches. Although the device's base 80 is shown with a diameter of 2.750 inches, there is little limitation on increasing the size of the base 80 for purposes of further stability or ease of packing and display. This size is large enough for ease of handling during use of the device and small enough to be easily transported. A skirt 90 can be added to the platform 80 which would increase the diameter and provide room for labeling the chambers 54,58. The skirt 90 can be constructed from plastic or cardboard and may include a hole or aperture (not shown) to allow the device to be hung on a store display or suitable hooks. The platform 80 in addition, may have means for connecting another device back to back with the first device.

Each chamber 54,58 is inset from the side of the internal disk 65 and each depression 76,82 forms a semicircle with a radius of about 0.370 inches and a width of approximately 0.240 inches. As can be seen in drawings 6,7, and 8, the battery channel 81 in which the new battery 36 is placed for loading is off center with respect to the depression 82. The inner wall of the battery channel's 81 rectangular inset 98 is on the diameter 94 of the circular disk 65 which bisects the chamber 58. The rectangular battery channel 81 for the battery 36 is approximately 0.398 inches long and 0.182 inches in width. The width of this battery channel 81 must be at least as wide as the battery 36 and the tension device, the battery holder 92, which holds the battery 36 in place. The length must be at least as great as the battery 36 and afford space for any pull-off tab (not shown) that may be located on the battery 36. The battery channel 81 may be widened to accommodate a larger battery 36.

In addition, the rectangular battery channel 81 may be longer to accommodate the storing of additional batteries 36 further in towards the center of the device 50 which could be rolled or sprung into the forward battery loading position. This would require a spring or additional mechanism to shift the additional batteries 36 from a stowage position to a loading position. Additional space and mechanisms are needed for automatic loading of batteries 36 from the battery channel 81 into the battery holder 92. The preferred embodiment 50 avoids the additional moving parts, subject to wear, which are necessary to automatically reload fresh batteries 36 into the battery holder 92. The moving of fresh batteries 36 in the battery holder 92 degrades the otherwise high reliability of this device 50. The preferred embodiment 50 does have an additional rectangular block 98 within the larger rectangular battery channel 81 which provides a back rest for the cylindrical battery 36 and a small open area if needed for any tab located on the battery 36.

Additionally, in the preferred embodiment 50, the channel 81 formed in the substrate 65 has been elongated towards the center of the internal disk 65 to accept the detent prong 86 of the cover 60. Thus, when the prong 86 falls into the extended portion of the channel 81, the cover portal 66 is locked into a position exposing one chamber 54 or 58.

Figure 9:
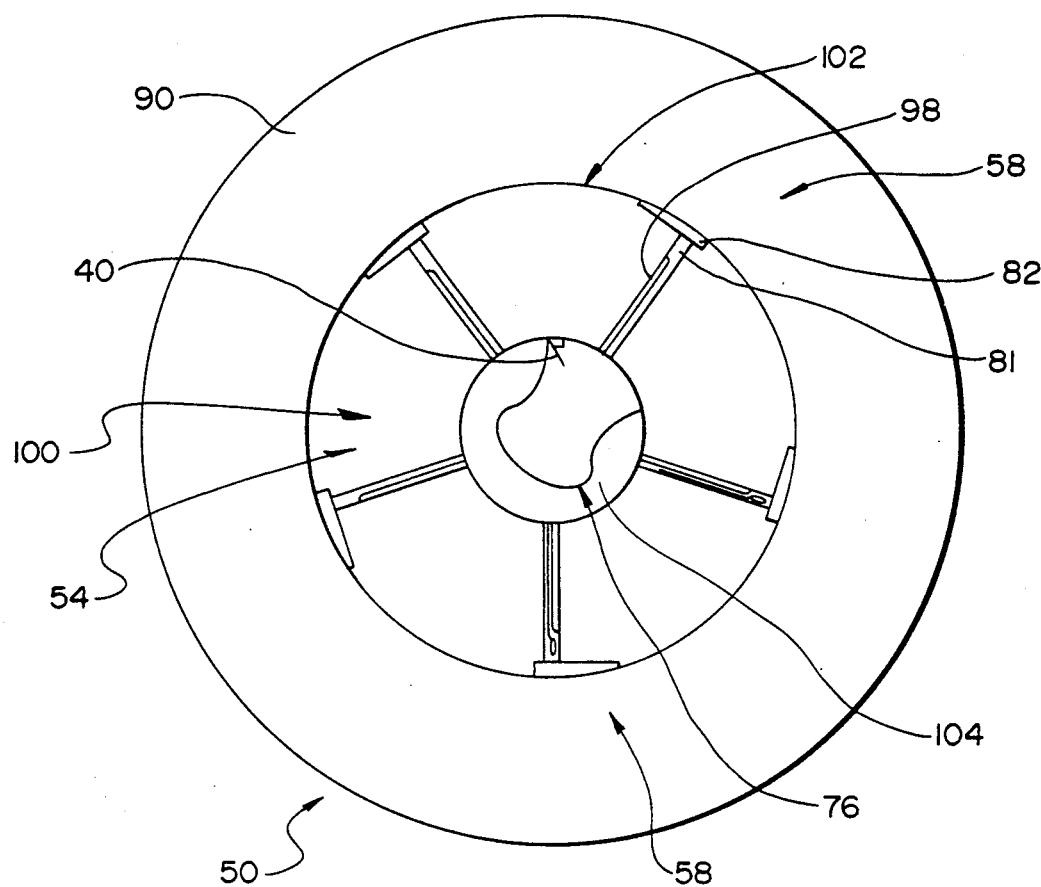
FIG. 9 is a top view disclosing another embodiment, a circular device allowing for easy installation and removal of batteries in hearing aids. The device includes an inner section for the removal of expired batteries from the hearing aid and an outer section for the installation of batteries.

FIG. 9 discloses another embodiment 50, a circular device without a cover 60 allowing for easy installation and removal of batteries 36 in hearing aids 30. The device 50 includes an inner circular section 100 for the removal of expired batteries 36 from the hearing aid 30 and an outer circular section 102 for the installation of batteries 36. The outer circular section 102 includes six chambers 54,58 for insertion of batteries 36. The insertion chambers 58 of the device include a concave depression 82 adjusted for the shape of the hearing aid attached to the battery channel 81, which holds the hearing aid battery 36 and its associated tab (not shown). The battery 36 is held in the battery channel 81 by a snug fit and a tab. The battery 36 is positioned so that when a hearing aid 30 is placed in the installation chamber 58 the battery 36 can be loaded into the hearing aid 30 with a single downward motion. The inner circular section 100 of the device 50 expels batteries 36 from hearing aids 30 with a single downward motion. The inner section 100 includes a spring-loaded platform 104 on the upper portion conforming to the shape of the hearing aid 30. The edge 40 of the removal device 50 includes a lip which extracts the battery 36 by making contact with the battery 36 at the appropriate angle. The batteries 36 are expelled into the inner portion of the substrate 65 where they may be stored. This embodiment also includes a large platform 80 and skirt 90 for easy handling of the device.

Figure 10:
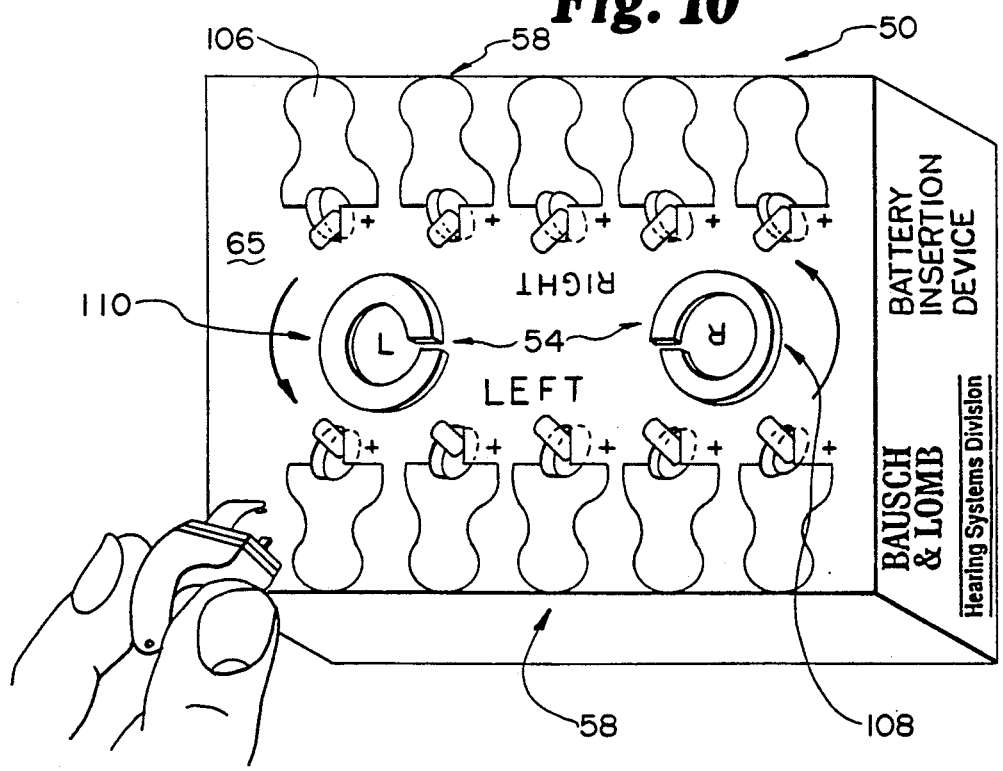
FIG. 10 is a perspective view of still another embodiment in which the batteries are dispersed in similar manner using a square or rectangular substrate. In this embodiment, left and right removal chambers are centrally located and require a twisting motion for ejection of spent batteries from the aid.

FIG. 10 discloses an embodiment of the invention 50 in the shape of a rectangle. In this embodiment there are ten insertion chambers 58 all located on the top of a rectangular block 65. Five of the insertion chambers 58 are for right hearing aids and five are for left hearing aid devices 30. Each chamber 58 has a deep recess 106 which conforms to the shape of the hearing aid 30. The fresh batteries 36 are positioned in the insertion chambers 58 so that with one downward motion a battery 36 may be simply installed in the hearing aid 30. In this embodiment, the removal of the hearing aid battery 36 is conducted at two centrally located positions 108,110 on the rectangular block, one for right hearing aids 108 and one for left hearing aids 110. This removal procedure differs than that of the other embodiments in that it requires a twisting motion rather than a downward motion. The effects of the motion are the same upon the battery 36 in that it slowly applies a sideward pressure on the battery 36 until it is released from its holder 34.

The operable internal structure, the substrate 65, of this device can just as easily be made square or hexagonal and mounted on a round base with a round cover 60. This invention can be made without a cover 60 as long as each battery 36 is tightly packed and is prevented from movement during shipping. Batteries 36 which are cylindrical or sphere shaped are particularly suitable for packaging and dispensing in accordance with this invention. Batteries 36 which have pull-off tabs can also be used in the present invention by modifying the battery holder 92 or not using one at all. Typical battery products 36 that are suitable for packing and dispensing in this way are Zinc air batteries, which are oxygen activated, silver-oxide, mercury, and nickel cadmium cells.

The terms and descriptions used herein are set forth by way of illustration only and are not meant as limitations. Those skilled in the art will recognize that any small battery can be packaged and dispensed in accordance with the instant invention, and that numerous variations are possible within the spirit and scope of the invention as defined in the following claims.

We claim:

1. A small battery dispenser capable of easily and individually dispensing each of a plurality of small batteries into an electronic device with battery holding means, the battery dispenser comprising:
   a substrate;
   a plurality of chambers formed in said substrate, each of said chambers comprising:
      a channel for securely holding at least one of said small batteries for dispensing, and
      a depression for receiving a portion of said electronic device; and
      at least one battery located in each of said channels in a position so that said battery can be inserted into said electronic device.

2. The dispensing device of claim 1 further comprising:
   a cover rotatably connected to the substrate;
   said cover having a portal formed therein so that when rotated only one chamber is exposed.

3. The dispensing device of claim 2 wherein said cover and said substrate have cooperating detent means formed therein for precisely aligning said portal with each of said chambers.

4. The dispensing device of claim 2 wherein said cover has corrugated sides so that said cover may be easily grasped and rotated with human hands.

5. A device for dispensing batteries into a hearing aid, the hearing aid having a battery holding means into which a battery may be inserted, the dispensing device comprising:
   a substrate for holding at least one battery;
   at least one channel formed in the substrate; and
   at least one battery located in the channel in a position so that the battery can be inserted into the hearing aid battery holding means.

6. The dispensing device of claim 5 further comprising:
   at least one depression formed in the substrate which is connected to the channel and is shaped to receive a portion of the hearing aid.

7. The dispensing device of claim 6 wherein the depression is shaped to receive a portion of a hearing aid for a right ear.

8. The dispensing device of claim 6 wherein the depression is shaped to receive a portion of a hearing aid for a left ear.

9. The dispensing device of claim 5 wherein the substrate is disk shaped.

10. The dispensing device of claim 5 wherein the substrate is rectangular.

11. The dispensing device of claim 5 further comprising:
    means for retaining the battery within the channel.

12. The dispensing device of claim 11 wherein the battery retention means is constructed from a soft pliable material.

13. The dispensing device of claim 5 for use with oxygen sensitive batteries, the dispensing device further comprising:
    means for preventing air contact to portions of oxygen sensitive batteries.

14. The dispensing device of claim 5 further comprising a platform connected to bottom of said substrate, said platform having a skirt with an aperture formed therein whereby the device may be hung on a store display.

15. The dispensing device of claim 14 wherein said platform has means for connecting to a similar platform of a similar dispensing device.

16. The dispensing device of claim 5 further comprising
    at least one chamber formed in the substrate for removing spent batteries from the hearing aid prior to inserting batteries; and
    means positioned in the chamber for removing a spent battery out of the hearing aid battery receiving means.

17. The dispensing device of claim 16 wherein the removal chamber is centrally located on the substrate.

18. A device for removing a battery from a hearing aid, the hearing aid having a battery holding means in which a battery is held, the battery removal device comprising:
    a substrate having at least one chamber formed therein; and
    removal means positioned in the chamber for removing a battery from the battery holding means.

19. The removal device of claim 18 wherein the removal means comprises a removal edge.

20. The device of claim 19 wherein the removal edge has at least one step formed therein.

21. The removal device of claim 18 further comprising:
    means within the substrate to receive the batteries removed from the battery receiving means; and
    means for retaining the batteries within the substrate.

22. A device of either claim 1 or 5 wherein the battery is inserted with a single downward motion.

23. A device of either claim 1 or 5 wherein the battery is inserted with a single inward motion.

24. A small multi-battery dispenser capable of easily and individually dispensing each of a plurality of small cylindrical batteries into an electronic device with battery receptive means, the battery dispenser comprising:
    a circular disk;
    means for securely holding said cylindrical battery along the outer circumference of said circular disk;
    wherein said battery holding means comprises a flexible holder which rests against at least one flat side of said cylindrical battery and assists in holding said cylindrical battery in place through friction; and
    wherein said battery holding means maintains said cylindrical battery in a position in which said cylindrical battery can be inserted into said electronic device.

* * * * *